Dec. 5, 1961        J. A. CLARK        3,011,398
SLIDE PROJECTOR

Filed Feb. 2, 1959        6 Sheets—Sheet 1

INVENTOR.
JAMES A. CLARK
BY
*ATTORNEYS*

Dec. 5, 1961 J. A. CLARK 3,011,398
SLIDE PROJECTOR
Filed Feb. 2, 1959 6 Sheets-Sheet 3

INVENTOR.
JAMES A. CLARK
BY
ATTORNEYS

Dec. 5, 1961    J. A. CLARK    3,011,398
SLIDE PROJECTOR

Filed Feb. 2, 1959    6 Sheets-Sheet 4

INVENTOR.
JAMES A. CLARK
BY
ATTORNEYS

Dec. 5, 1961    J. A. CLARK    3,011,398
SLIDE PROJECTOR
Filed Feb. 2, 1959    6 Sheets-Sheet 5

INVENTOR.
JAMES A. CLARK
BY
ATTORNEYS

Dec. 5, 1961 J. A. CLARK 3,011,398
SLIDE PROJECTOR
Filed Feb. 2, 1959 6 Sheets-Sheet 6

INVENTOR.
JAMES A. CLARK
BY
*J. A. Ellestad*
*B. A. Chiama*
ATTORNEYS

3,011,398
SLIDE PROJECTOR
James A. Clark, Brighton, N.Y., assignor to Bausch & Lomb Incorporated, a corporation of New York
Filed Feb. 2, 1959, Ser. No. 790,451
12 Claims. (Cl. 88—28)

The present invention relates to projection apparatus and, more particularly, to a slide projector for projecting transparencies such as slides.

Apparatus of this general character, especially of the automatic type, include a number of integrated mechanisms which cooperate to perform the desired result of automatic projection. The more important of these mechanisms are a slide pickup and return mechanism, a control for timed projection, various clutch arrangements for insuring precise actuation of the various mechanisms, and a motor drive arrangement. The present invention contemplates an improvement in each of the above features to thereby enhance the operational attributes of the slide projector. Therefore, it is the principal object of the present invention to provide an improved automatic slide projector embodying various improved features inherent therein.

Another object of the invention is to provide a simplified and compact structure which is adapted to project a plurality of transparencies individually and in timed sequence.

Another object of the invention is to provide an improved slide projector which may perform the operations mentioned semi-automatically or automatically.

Still another object of the invention is to provide an improved slide projector which is economical to manufacture and maintain and occupies a minimum of space.

Other objects and advantages will become apparent to those skilled in the art by reference to the following specification and accompanying drawing wherein.

Figure 1:
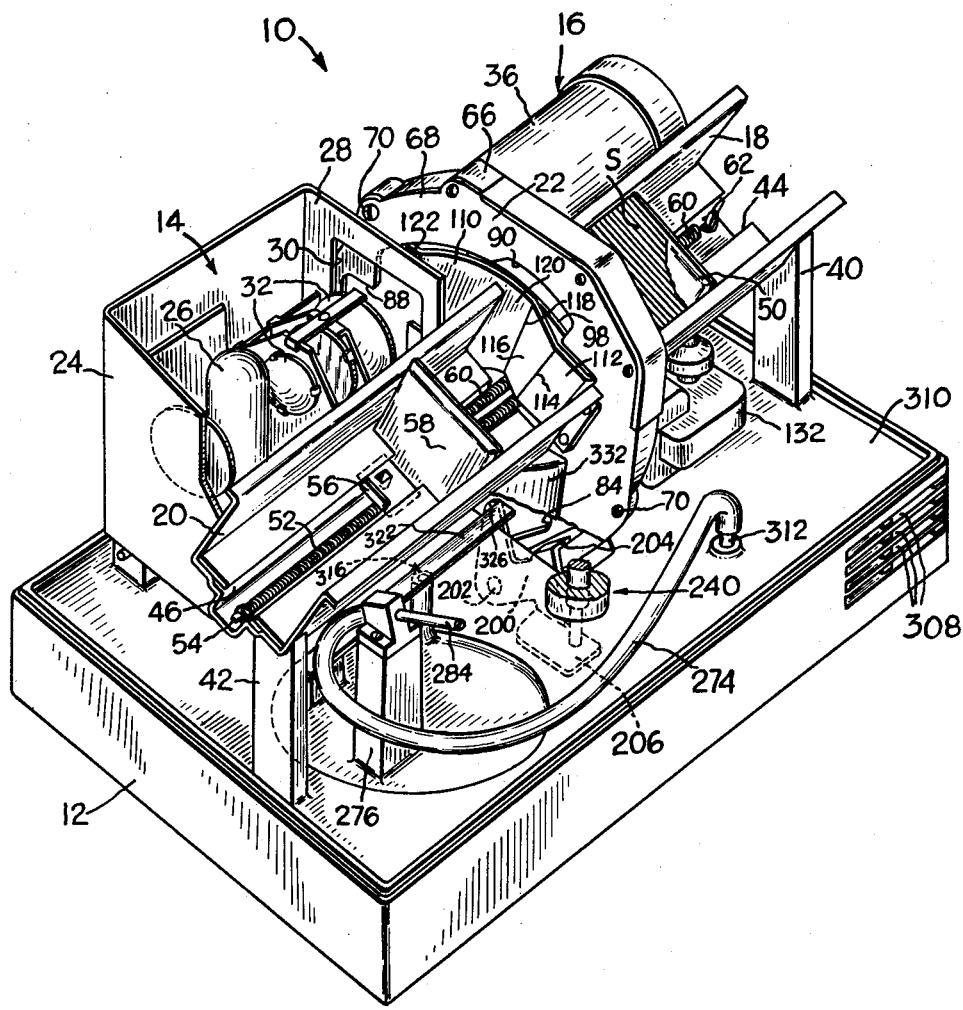
FIG. 1 is a perspective view of a slide projector embodying the invention with the casing or cover and portions of the lamp housing removed.
Figure 2:
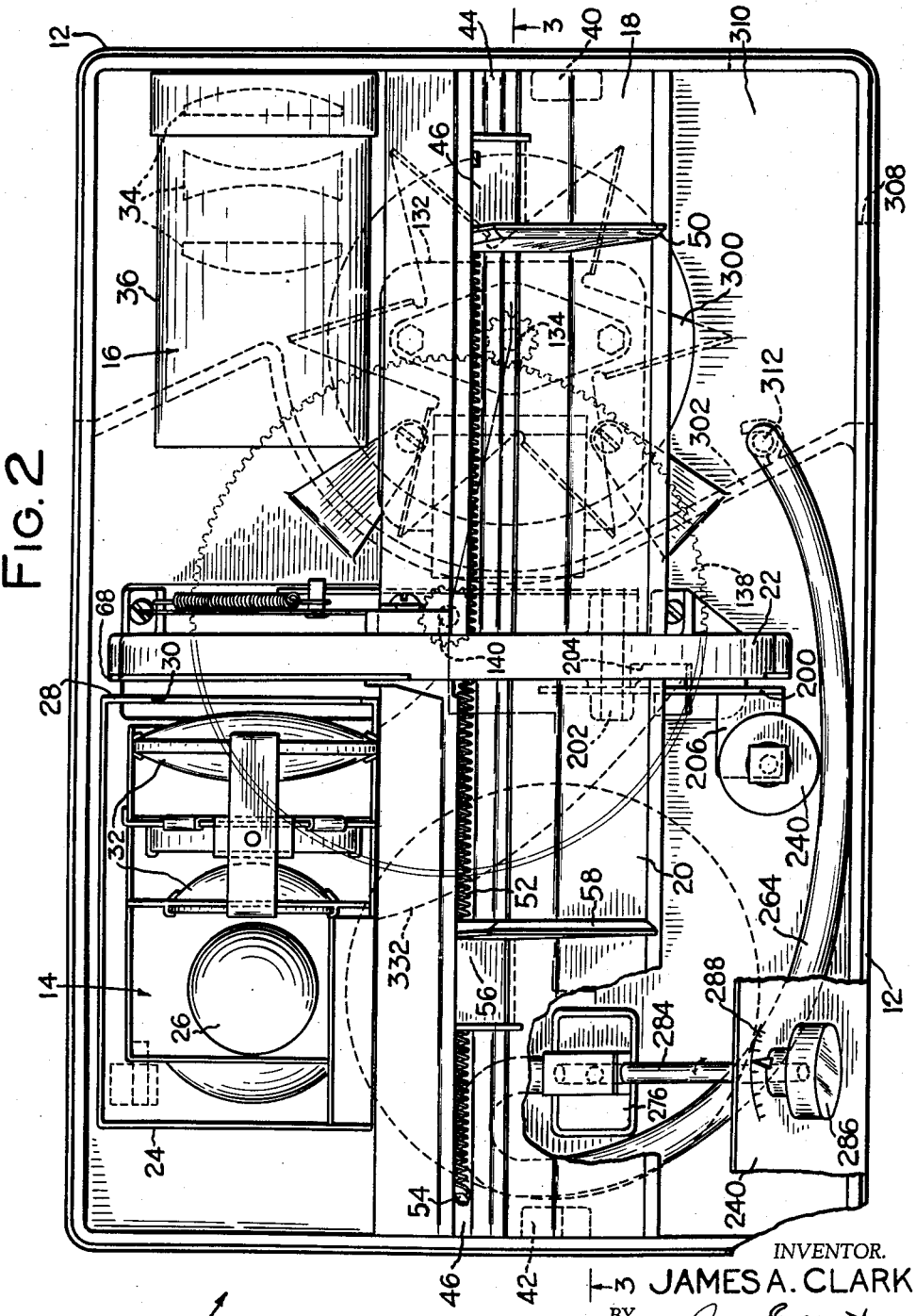
FIG. 2 is a plan view of the projector of FIG. 1.

Referring to the drawings and more particularly to FIGS. 1 and 2, there is shown a slide projector designated generally by the reference numeral 10 having a base 12 for mounting a suitable decorative cabinet (not shown) and for supporting the various mechanisms of the present invention. Arranged on the base 12 is a conventional light source 14, a projection system 16, a trough 18 for holding a plurality of slides S before projection thereof, another trough 20 for receiving the slides after projection, and a slide transfer ring housing 22 situated between and separating the troughs.

Figure 3:
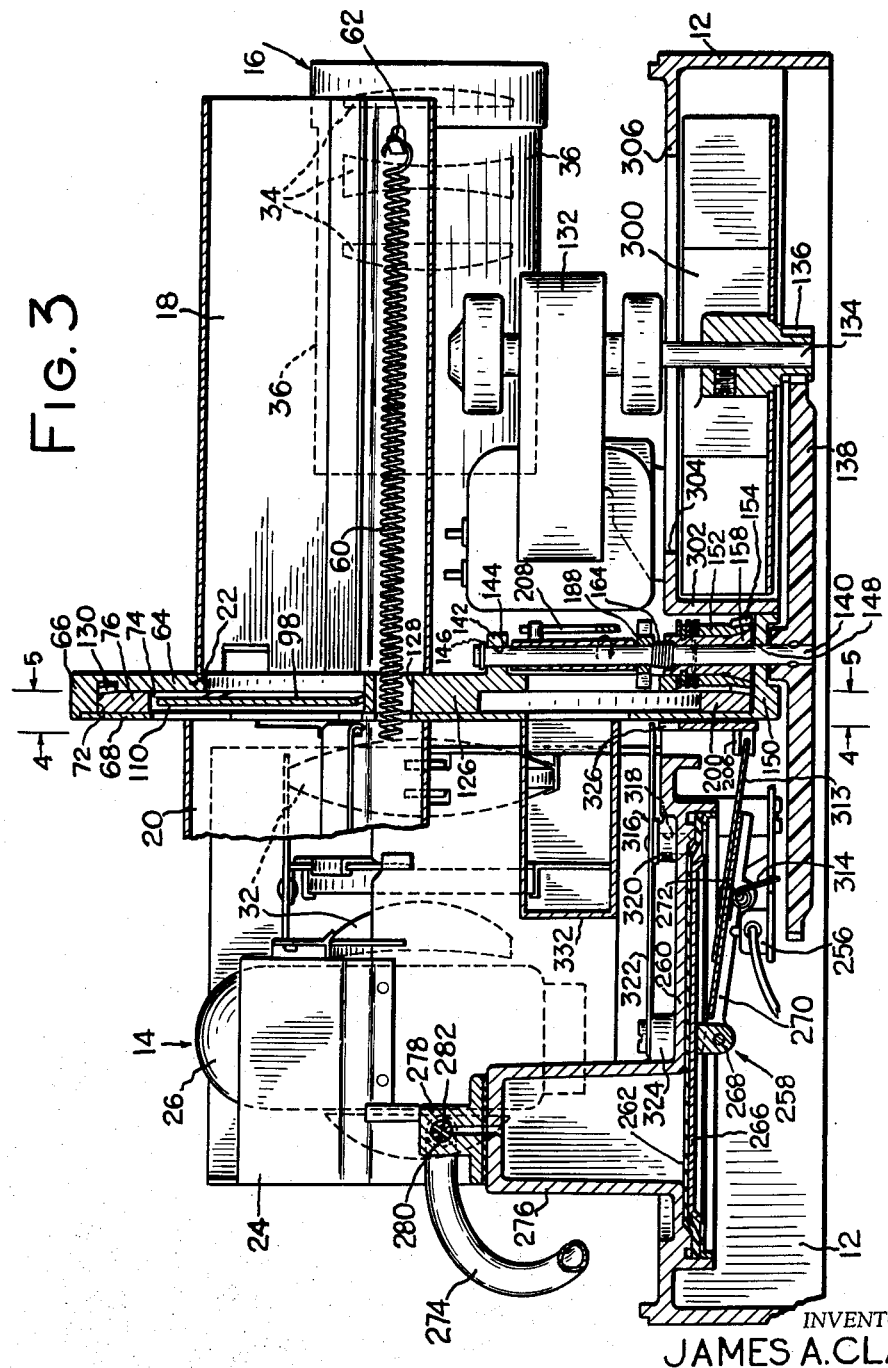
FIG. 3 is a longitudinal sectional view taken on the line 3—3 in FIG. 2 and showing some parts broken away.

Referring now to FIGS. 1, 2 and 3 for a more detailed description of the various mechanisms of the present invention, the light source 14 is shown as comprising a housing or shield 24 which is suitably mounted on or integral with the base 12 and serves to protect a conventional projector lamp 26. The housing 24 has a front wall 28 which is provided with an aperture 30 through which light is projected from the lamp 26 by a system of condensing lenses 32 mounted in a cell attached to the base 12. In axial alignment with the lamp 26 and the condensing lenses 32 are focusing lenses 34 shown in FIG. 2 as housed in a cylindrical housing 36 which together with the condensing lenses comprise the projection optical system 16. A focusing mechanism (not shown) may be associated with the projection system 16 in order to move the focusing lenses toward or away from the condensing lenses 32. Detailed descriptions of a focusing mechanism is unnecessary since its operation will be apparent to those skilled in the art.

As noted in FIGS. 1 and 2, the axis of the projection system comprising the lamp 14, the lenses 32 and the lenses 34 is slightly offset with respect to the longitudinal center line of the base 12 in order to accommodate a slide holding arrangement. Immediately adjacent to the projection system and having its axes parallel with the axis of the system are the slide carrying troughs 18 and 20. The trough 18 serves to hold slides which are to be projected, and is supported at one end upon the base 12 by a standard 40 and at the other end by attachment to the slide transfer ring housing 22. As shown in FIG. 1, the trough is square in cross-section and is supported along one longitudinal edge. The receiving trough 20 is of the same configuration as the trough 18 and serves to hold those slides which have been projected. A suitable standard 42 supports the trough at one end while the other end is fastened to the housing 22. It will be noted that the longitudinal axes of the troughs 18 and 20 are substantially in alignment.

The troughs 18, 20 are formed with channels 44, 46, respectively, extending longitudinally along their bottom sides and these channels are also approximately aligned. A guide shoe 48 is adapted to be retained in and slidably moved along the channel 44 and has integral therewith an upstanding square feeding plate 50 which is movable along the walls of the trough 18. A relatively long coil spring 52 anchored at one end at a point 54 adjacent the extreme outer end of the channel 46 is connected at its other end to the guide shoe 48. As shown in FIGS. 1 and 2, the spring 52 is held in tension and is positioned within the channel 46 and extends therealong, projects through the transfer ring housing 22 and is positioned within the channel 44 of the trough 18. In this manner, the plate 50 is continually biased toward the housing 22 for biasing the slides S toward the housing 22. Similarly, a guide shoe 56 is retained in and slidably movable along the channel 46 of the trough 20 and has integral therewith an upstanding square retaining plate 58 movable along the walls of the trough 20. A second relatively long coil spring 60 anchored at one end at a point 62 adjacent the extreme outer end of the channel 44 is connected at its other end to the guide shoe 56. This spring is held in tension between the anchor 62 and the shoe 56 to continually bias the plate 58 toward the housing, and, as was the case for spring 52, projects through the housing 22.

The slide carrier or transferring mechanism of the present invention is completely housed within the housing 22 which comprises a plate 64 having a generally circular relatively thick flange 66 along the peripheral edge thereof, and a flat plate 68 fastened to the flange 66 by suitable screws 70. The inner edge 72 of the flange is circular and this together with the plates 64, 68 define an interior chamber 74 having a circular border contiguous to the edge 72. Confined within the chamber 74 and freely rotatable therein is a slide carrier or transfer ring 76 formed with a circular peripheral edge 78 slidably engaging the inner edge 72 of the flange 66.

Figure 5:
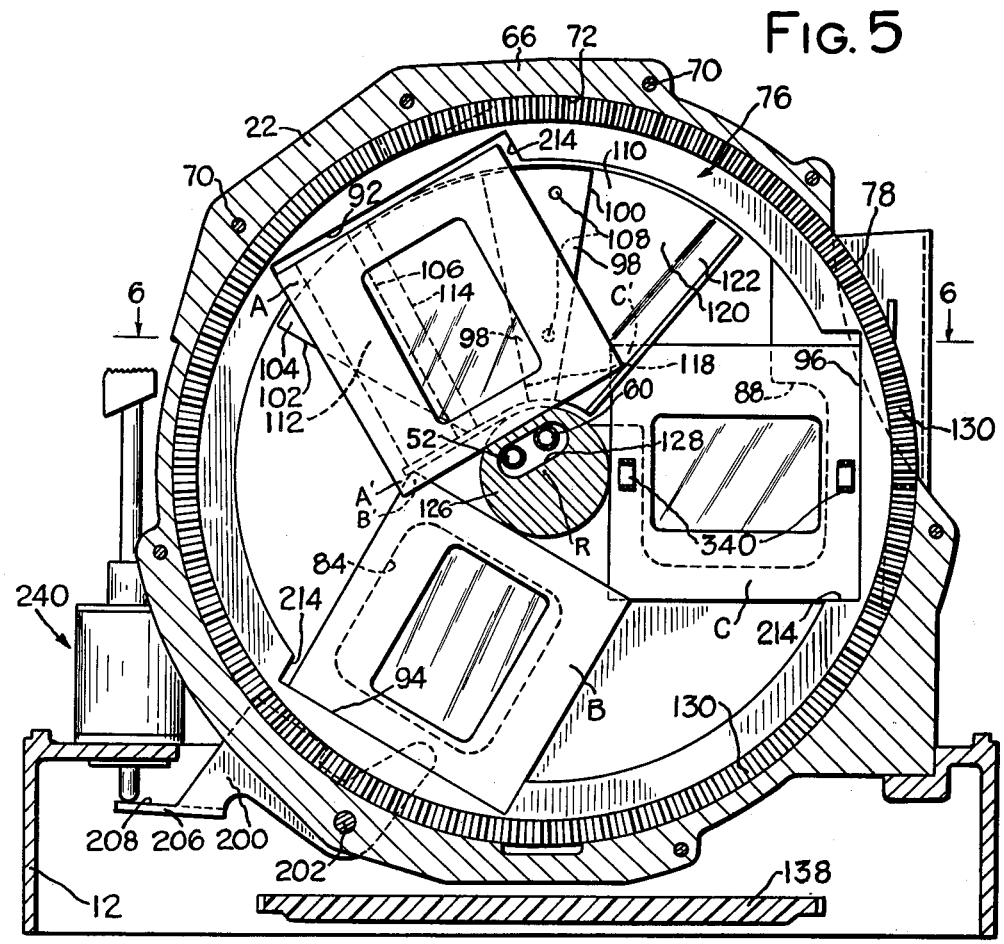
FIG. 5 is a sectional view taken on the line 5—5 in FIG. 3.

In a single sequence of operation, for one full rotation of the transfer ring 76, the same is adapted to pick up a slide from the trough 18 through an opening 80 in the plate 64, transfer the same to a preheating station adjacent opposed openings 82, 84 formed in the plates 64, 68, respectively, thence to a projection station adjacent opposed openings 86, 88 in the plates 64, 68, respectively, and lastly to a return station where the slide is deposited in the trough 20 through an opening 90 in the plate 68. To this end, as shown in FIG. 5, the ring 76 is formed with three notches 92, 94 and 96 along the inner edge of the ring. The notches are of equal length and are equally spaced circumferentially about the ring, that is, 120°. It will be noted that the length of each of the notches is slightly larger than the length of a slide A, which is illustrated in FIG. 5 as abutting one end of the notch 92. In that figure, the slide A is in a pickup position adjacent the pickup station denoted by the openings 80, 90, a slide B, associated with the notch 94, is in a preheating position adjacent the preheat station denoted by the openings 82, 84, and the slide C is in a projection position adjacent the projection station denoted by the openings 86, 88. Actually, the pickup position for the ring 76 is also the return position since a slide is picked up at approximately the same time as a previously projected slide is returned to the trough 20. This will be obvious since the troughs 18 and 20 are substantially in alignment. The exact movement of the slides in this portion of the ring 76 will be described hereinafter.

Figure 6:
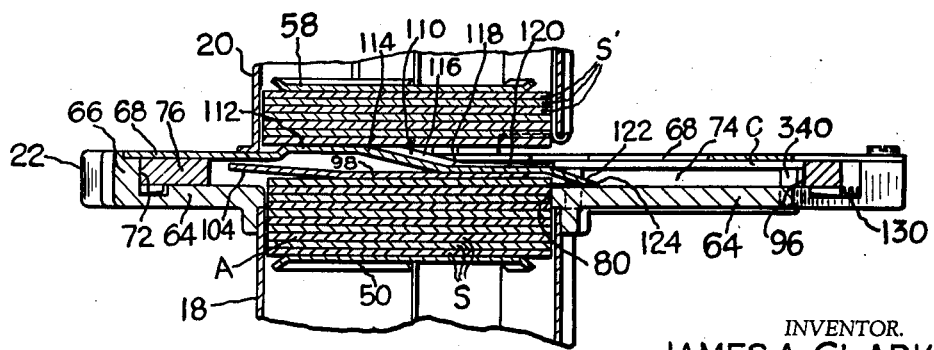
FIG. 6 is a fragmentary sectional view of the slide transfer ring taken on the line 6—6 in FIG. 5.

Extending within the chamber 74 of the housing 22, is a first baffle plate 98, see FIGS. 3, 5 and 6, having a leading edge 100 and a trailing edge 102. The plate 98 resembles a sector and the edges 100, 102 extend approximately radially with respect to the center of curvature R for the ring 76. A trailing portion 104 of the plate 98 is slightly bent along a line 106 for a purpose to appear hereinafter. The plate 98 is fastened by rivets 108, or otherwise, to a second baffle plate 110 which also extends, for the most part, within the chamber 74. This plate is made integral with the housing plate 68 which supports both plates 98 and 110. Shaped somewhat like the plate 92, but larger, the baffle 110 resembles a sector and spans across the slide outlet opening 90 formed in the housing plate 68, see FIG. 1. In FIGS. 1 and 6, it will be noted that the baffle plate 110 protrudes outwardly slightly from the plane of the plate 68 to form a flat portion 112 the plane of which is parallel to but offset from the plane of the plate 68. Continuing further, the plate 110 is bent along a line 114 to form an angled portion 116 which extends through the opening 90 in the plate 68 and into the chamber 74, is further bent along a line 118 to form a flat portion 120 the plane of which is parallel to the plane of the portion 112 and is disposed approximately midway between the opposing inner surfaces of the plates 64 and 68. It is to the portion 120 of the baffle 110 that the baffle 98 is secured by the rivets 108, as previously mentioned. The baffle 110 terminates in a portion 122 which is bent further across the chamber 74 and ends in a beveled edge 124 which almost reaches the inner surface of the plate 64. It will be understood that the bends at lines 114 and 118 and the bend between the portions 120 and 122 are not sharp but, rather, arcuate or gently curved. The importance of this configuration of the baffle plate 110 will be appreciated when the operation of the present invention is described hereinafter. To complete the transfer ring housing structure, the plate 64 is formed with an interiorly extending hub 126 which engages the plate 68 and has its center at R. Suitable means may be employed to fasten the plate 68 at this point to the adjacent surface of the hub. As previously mentioned, the springs 52 and 60 project through the ring housing 22 and to facilitate this, the hub 126 and the adjacent portions of the plate 68 are formed with an oval shaped opening 128 for accommodating the springs.

As previously stated, and from the above description of the housing 22, the transfer ring 76 is adapted for rotation within the housing. The ring, being relatively narrow radially, will not be obstructed in its movement by the baffle plates 98 and 110 since these elements are mounted within the central opening of the ring. In order to rotate the ring about its center of curvature R, the ring is provided with a ring gear 130 which is formed on one side adjacent to the periphery of the ring 76.

A motor driven gear mechanism is provided for cooperating with the gear 130 and thereby rotate the ring 76 and to this end a suitable motor 132 is mounted on the base 12 beneath the trough 18. The motor rotates a shaft 134 having a gear 136 secured thereto at one end and a relatively large gear 138 in mesh with the gear 136. As shown in FIG. 3, the gear 138 is positioned within the base 12 immediately below the ring housing 22 and has secured thereto a shaft 140 which is supported by a horizontally extending projection 146 made integral with the hub 126. This projection is formed with an opening 144 in which the shaft 140 is journaled and a lock washer 146 secured to the upper end of the shaft maintains vertical positioning of the shaft and the gear 138. The shaft 140 is also journaled in an opening 148 formed in a depressed floor portion 150 of the base 12 and is thereby maintained against lateral displacement.

During operation, the motor 132 is continually energized and the gears 134, 138, and the shaft 140, are continually rotating. A clutch mechanism is provided to selectively connect the ring gear 130 with the rotating shaft 140 for imparting rotation to the transfer ring 76. The clutch mechanism includes a short sleeve 152 having gear teeth 154 formed at one end in mesh with the ring gear 130 and being formed interiorly with a tapering surface 156. Mounted within the sleeve 152 is a second sleeve 158 having an outer configuration which conforms with the inner configuration of the sleeve 152. The taper 156 on the sleeve 152 cooperates with a taper 160 formed exteriorly on the sleeve 158, each of the tapers being the exact counterpart for the other. The sleeves 152, 158 are mounted coaxially about the shaft 140 with the shaft being adapted to rotate relative to the inner sleeve 158.

At the upper end of the sleeve 158 from its tapered end 160, there is formed a counterbore 162 into which is mounted a coil spring 164 having a lower section 166 which fits within the counterbore and an upper section 168 which rises above the end of the sleeve 158 and has a diameter smaller than the lower section. The which fits within the counterbore and an upper section thereof has an inner diameter slightly smaller than the diameter of the shaft 140 for resiliently grasping the latter whereby rotation of the shaft will impart rotation to the spring. A short, axially extending slot 170 is formed in the wall of the sleeve 158 adjacent the counterbore 162 and has retained therein the lead tip 172 of the lower section of the spring 164. From this, it will be apparent that rotation of the shaft will cause corresponding rotation of the spring 164 which will, in turn, cause rotation of the inner sleeve 158. In order to impart this latter rotation to the transfer ring 76, means are provided to produce a friction connection between the sleeves 152 and 158. To this end, a series of washers 174, 176, 178, 180 are positioned in face to face relationship above the end of the outer sleeve 152 and these are made to encircle the inner sleeve 158. The washer 178 has an inner diameter slightly smaller than the outer diameter of the sleeve 158 and is locked against axial movement by the insertion of the inner edge thereof in a circular groove 182 formed in the outer surface of the sleeve. A disk spring 184 encircles the sleeve 158 and is retained between the washers 176, 178. The lowermost washer 174 is locked against movement in a downward direction by its abutment with the upper end of the sleeve 152, while the washer 176 is retained against movement in an upward direction by its abutment with the washer 178. In order to maintain the series of washers and the sleeves 152, 158 in their respective positions, the uppermost washer 180 is retained against upward movement by its engagement with a protrusion 186 formed on the plate 64 of the housing 22 and the inner sleeve 158 is retained against downward movement by the portion 150 of the base 12. The spring 184 serves to maintain a continual downward axial force upon the outer sleeve 152 relative to the inner sleeve 158 and thereby cause the exertion of pressure of the tapered portion 156 upon the tapered portion 160. This pressure is sufficient to cause rotation of the sleeve 152 during rotation of the inner sleeve 158 when the former is free to rotate. Rotation of the sleeve 152 by the structure described aforesaid will consequently impart rotation to the transfer ring 76.

Figure 9:
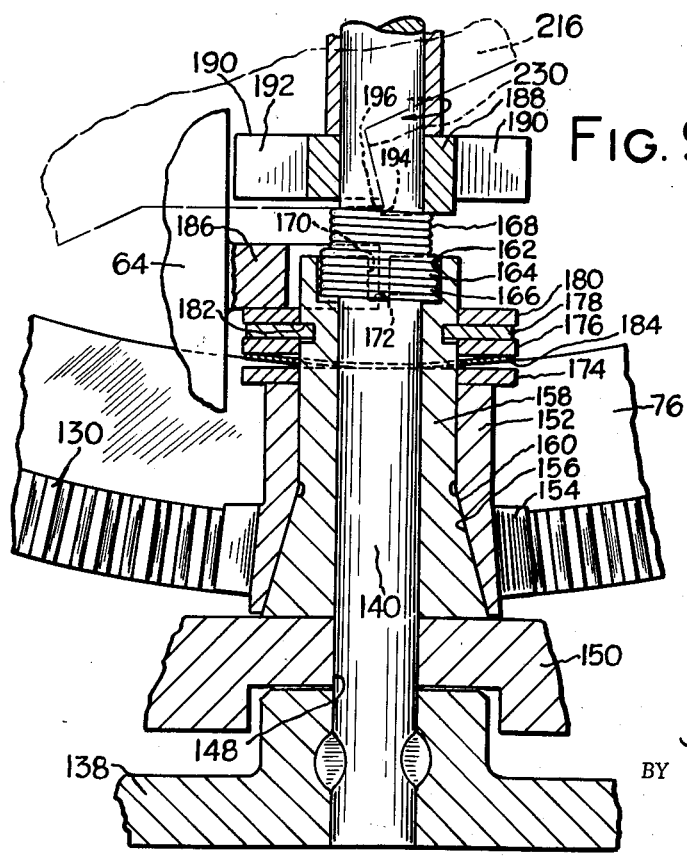
FIGS. 9 and 10 are enlarged sectional views of a detail of the present invention.
Figure 10:
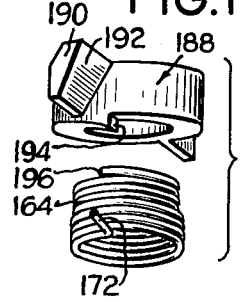

In order to permit free rotation of the shaft 140 without corresponding rotation of the sleeves 152, 158 under certain conditions of operation of the projector 10, means are provided for enlarging the upper section 168 of the spring 164. This means takes the form of an actuator ring 188 which encircles the shaft 140 and rests upon the upper end of the spring 164. The ring is formed with two diametrically opposed wings 190 each of which has an angled surface 192 which trails the wing as the same is rotated about the axis of the shaft 140. In FIG. 9, it will be noted that the direction of rotation of the shaft 140 is in the direction indicated by the arrow and, therefore, only the left wing 190 has its angled surface 192 showing. The ring 188 is also formed with an axially extending shoulder 194 which is adapted to engage the upper extreme end 196 of the coil spring 164. The ring 188 is loosely retained on the shaft 140 but rotation of the spring 164 due to the tight connection between the upper section 168 of the spring 164 and the adjacent portion of the shaft 140 will cause rotation of the ring 188 because of the engagement thereof with the end 196 of the spring 164. In the event the ring 188 is positively retained against rotation, the shoulder 194 will serve as an anchor for the end 196 of the spring 164 and cause the latter to unwind thereby loosening its grip on the shaft 140. In this event further rotation of the shaft 140 will have no effect upon the elements 152, 158 and 164 and the drive between the shaft and the transfer ring 76 will be disconnected. Release of the ring 188 will, of course, permit gripping of the shaft by the upper section 168 of the spring 164 and the clutch mechanism is once again engaged.

Figure 8:
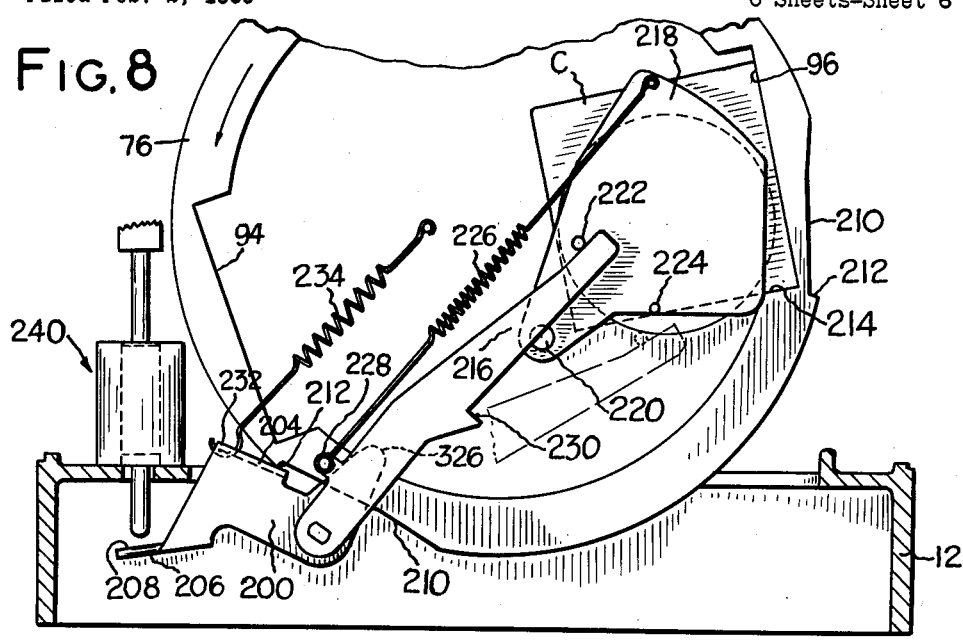
FIG. 8 is an elevation of one side of the slide transfer ring housing showing the relationship of the shutter utilized in the present invention.

The foregoing description of the clutch mechanism for controlling the drive of the transfer ring 76 cooperates with a braking device which in turn is operatively associated with the shutter for the projector 10. As shown in FIGS. 2 and 8, the braking device takes the form of a detent mechanism and comprises a rotatable latch member or dog 200 positioned on the side of the housing 22 adjacent the trough 20 and which is secured to one end of a shaft 202 rotatably mounted in the flange 66 of the housing 22. The dog 200 includes a flat plate 204 across the top thereof and an extension 206 having an upper surface 208 the plane of which is traversed by the axis of the shaft 202. The plate 204 is adapted to selectively cooperate with any one of three depressions 210 formed on the outer periphery of the transfer ring 76 on the side thereof away from the gear 130. Each of the depressions 210 is formed adjacent one of the notches 92, 94 or 96 formed on the ring 76 so that the end shoulder 212 of the depression 210 is approximately radially aligned with the end of the corresponding notch which is in abutment with a slide. To illustrate, in FIG. 8, the slide C, which is in projection position, is against the end 214 of the notch 96 which in turn is radially aligned on the ring 76 with the shoulder 212 for the depression 210.

Positioned on the other side of the housing 22 and secured at the other end of the shaft 202 is a shutter lever 216 which will rotate with the shaft upon rotation of the dog 200. The lever 216 serves to rotate, in either direction, a shutter 218 pivotally mounted at 220 to the plate 64 of the housing 22. To accomplish this, the other end of the lever 216 is adapted to engage a pin 222, secured to the shutter, during counterclockwise rotation of the lever for rotating the shutter into a position in which it intercepts light from the light source 14, such position shown in FIG. 8. Upon clockwise rotation of the lever 216, the same will engage a second pin 224 also secured to the shutter for forcing the same downwardly to thereby permit the transmission of light. A coil spring 226 connected between one edge of the shutter and a lip 228 formed on the lever 216 causes the shutter to snap to either of its positions when the same has moved approximately half of its travel to that position. The spring serves as an over center spring which is under tension in either position of the shutter so that the shutter is maintained under spring tension while in either position. The lever 216, upon rotation, will overcome the force of the spring until the shutter is midway in its travel whereupon the spring will take over to force the continued movement of the shutter.

The lever 216 also has formed on the lower edge thereof a stop shoulder 230 which is adapted to engage one of the wings 190 on the actuator ring 188 when the lever has been rotated in a clockwise or downward direction. As previously stated, in the event the ring 188 is held against rotation, the upper section 168 of the spring 164 will become unwound upon the shaft 140 to thereby terminate rotation of the transfer ring 76 under action of the shaft 130. When the lever 216 is rotated downwardly, as viewed in FIG. 8, the shoulder 230 will engage one of the surfaces 192 on the corresponding wing 190 to arrest rotation of the ring 188 and the drive for rotating the transfer ring 76 will be broken. Simultaneously, the shuttere 218 will be moved out of its light intercepting position in order to permit projection of a slide C.

While the above description refers to the braking of the drive connection to the transfer ring 76, the more positive and instantaneous stopping of the rotation of this ring is accomplished when the plate 204 of the dog 200 is seated within a depression 210 such that the edge 232 of the plate 204 is in abutment with the shoulder 212 of the depression. To assist in the reception of the plate 204 into one of the depressions 210, a relatively weak coil spring 234 is held in tension between a connection thereof on the housing 22 (not shown) and a point on the dog 200. In operation, during rotation of the transfer ring 76, under action of the shaft 140, the corner of the shoulder 212 will ride upon the plate 204, as shown in FIG. 8. As a depression 210 comes around to a position such that it is aligned with the plate 204, the same will be forced into the leading portion of the depression, which it will be noted is larger than the length of the plate 204. Continual rotation of the ring 76 will allow the plate to travel along in the depression until the edge 232 comes in contact with the shoulder 212 whereupon the rotation of the ring 76 will be stopped abruptly.

Simultaneously with the initial movement of the plate 204 into the leading portion of the depression 210, the dog 200 will have rotated causing corresponding rotation of the lever 216 which rotation results in two actions heretofore described, namely, the shutter 218 will be driven out of its light intercepting position, and the shoulder 230 will engage one of the wings 196 to break the driving connection between the shaft 140 and the ring 76. In the former action, when the shutter and the lever 216 are over their center position, the spring 226 will snap both the shutter and the lever to the lowermost position thereby permitting the shoulder to be in position to engage the wing 190. The clutch mechanism shown in FIG. 9 is designed so that the ring is positively stopped by the engagement of the edge 232 with the shoulder 212 an instant before the spring 164 completely releases the shaft 140. During this instant, the shaft 140 will continue to rotate the inner sleeve 158 which will then merely rotate within the outer sleeve 152 since the latter sleeve is now fixed. This will permit over travel of the elements of the clutch mechanism and thereby insure that the rotation of the ring 76 will at all times be stopped suddenly when the shutter has been moved, otherwise any slight rotation of the ring will at this point be noticed during projection of a slide C.

With the shoulder 212 of the depression 210 radially aligned with the end 214 of one of the notches 96, stoppage of the ring 76 will occur when a slide C is in projection position, another slide is in preheat position and a third slide is being picked up by the ring 76. To maintain continual operation, as will be more fully described hereinafter, the dog 200 need merely to be rotated slightly in a counterclockwise direction, as viewed in FIG. 8, in order to move the edge 232 out of contact with the shoulder 212. Upon this occurrence, the shoulder 230 will ride off of the surface 192 on the wing 190 and the connection of the ring 76 to the shaft 140 is once again established. As the lever 216 starts its counterclockwise rotation, it will engage the pin 222 to initiate rotation of the shutter into a ligh intercepting position, with the spring 226 assisting this action on the subsequent rotation of the shutter. The wind-up of the spring 164 upon the shaft 140 will be slow enough to permit the shutter to be completely positioned in its light intercepting position before rotation of the transfer ring 76 is effected.

Figure 4:
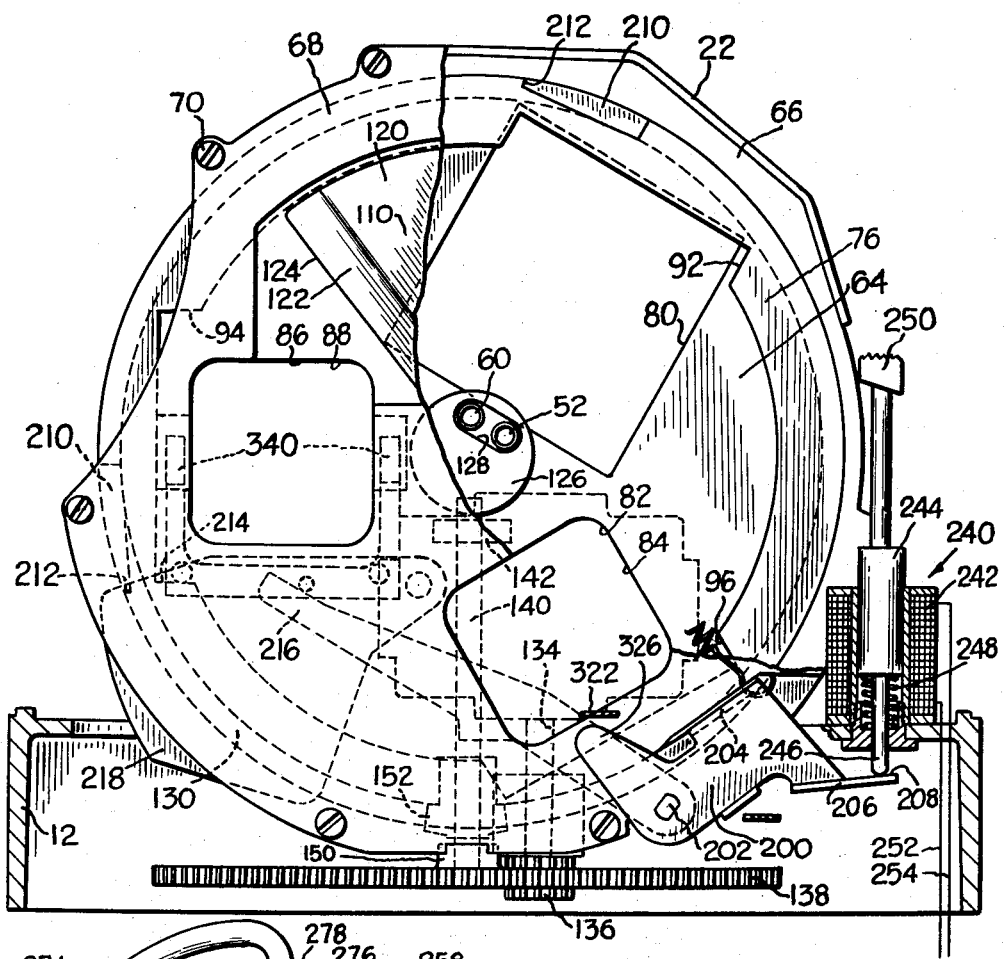
FIG. 4 is a sectional view taken on the line 4—4 in FIG. 3.

Various means may be utilized to effect rotation of the dog 200 to sequentially rotate the transfer ring 76 in order to successively project the slides S. As shown in FIG. 4, a solenoid 240 is mounted on the base 12 and includes a coil 242 and a plunger 244 having a tip 246 engageable upon the surface 208 of the dog 200. Energization of the coil 242 will cause downward movement of the plunger 244 for rotating the dog 200 out of engagement with the end 212. A coil spring 248 encircles the tip 246 and is held in compression between the plunger 244 and the base 12 in order to normally maintain the tip out of contact with the dog 200, as shown in FIG. 8. An insantaneous holding of the tip 246 in its lower position is all that is necessary to effect release of the dog 200 from the depression 210. Once the ring 76 starts to rotate, the coil 242 may be deenerized. A push button 250 mounted on top of the plungere 244 is utilized to effect manual movement of the tip 246 for manual operation of the projector if this be desired.

Figure 7:
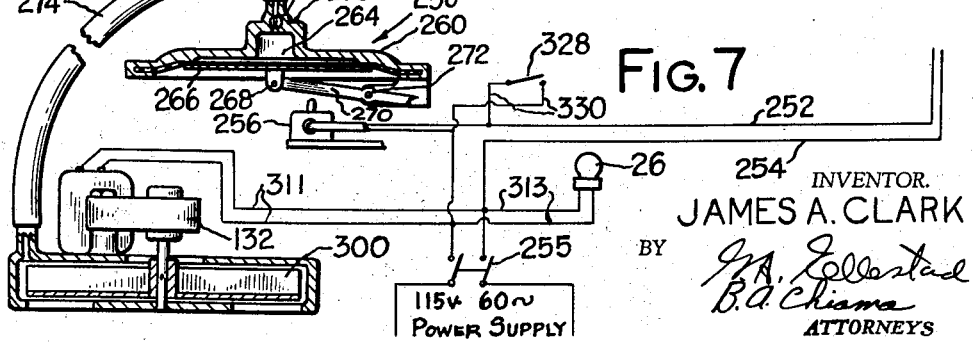
FIG. 7 is a schematic showing of the timer control utilized in the present invention.

The solenoid coil 242 may be energized at a remote distance or in variable time sequence, both features of which are shown schematically in FIG. 7. A pair of conductors 252, 254 serves to conduct energizing current to the coil 242 from a suitable source of ordinary house current of 115 volts by means of a double pole "start" switch 255 connected between the source and conductors. A push button switch 256 of the snap action type is intereposed in the conductor 252 for controlling energization of the coil 242. To actuate the switch 256 in time sequence, there is provided a pneumatic cell 258 having a disk shaped rigid wall 260 and a flexible membrane 262 stretched across the open end thereof for defining a pneumatic chamber 264 therebetween. A rigid plate 266 is secured to the outside surface of the membrane 262 and is provided with a stud 268 for pivotally supporting a lever 270 at one end thereof. The lever is also pivotally mounted intermediate its ends on the base 12 at 272 (see FIG. 3) so that expansion of the chamber 264 will cause downward movement of the plate 266 and rotation of the lever in a counterclockwise direction. Upon this occurrence, the lever 270 will engage the push button switch 256 and cause the same to close thereby permitting energization of the coil 242.

The flow of air into the chamber 264 is effected through a flexible tubing 274 connected to a rigid, air-tight enclosure 276 which is in communication with the chamber 264. A manually operable valve element 278 rotatably mounted within a bore 280 formed in the top wall of the enclosure 276 and having a passageway 282 serves to control the flow of air into the chamber 264. As shown in FIG. 4, the passageway 282 is in a position to permit unrestricted flow of air and between this postion and one in which the passageway is turned a few degrees therefrom, as shown in FIG. 3, wherein the valve is completely closed, the air flow through the valve may be varied proportionally. The time during which it takes the membrane 262 to deflect sufficiently to close the switch 256 will be determined by the amount of air flowing through the valve element 278 which in turn will be determined by the positioning of the passageway 282. The valve element 278 is connected to a shaft 284 having a knob 286 at the extreme end thereof for cooperation with a suitable scale 288 inscribed on a panel 290. The scale 288 graduated in seconds of time, say from 0 seconds to 60 seconds, may be employed to correspond with the two extreme positions of the valve element 278 and thereby indicate the time it takes to close the switch 256. In this manner, the time during which projection of the different slides will take place may be controlled and once the valve element 278 is set, subsequent projections of the slides will take place automatically and sequentially, as long as the tubing 274 has a continuous source of supply of air.

A continuous supply of air is supplied by the cooling fan for the projector which fan is also arranged to cause preheating of the slides before they are projected. As shown in FIGS. 2, 3 and 4, a fan 300 is mounted on the shaft 134 of the motor 132 and occupies a position within the base 12 below the motor 132. A baffle 302 for the fan extends transversely across the base and is made integral with the sides thereof. An opening 304 formed in the deck 306 of the base 12 serves as the inlet for the fan while suitable slits 308 formed on one corner 310 of the base permit egress of the air expelled by the fan. While rotating in order to cool the light source, as will be described presently, the fan will create pressure between the same and the outlet corner 310. The end of the tubing 274, remote from the valve element 278, is connected to this pressure chamber at 312, see FIGS. 1 and 2, in order to provide a continuous supply of air to the casing 276. It will be apparent then that as long as the cooling fan 300 is in operation, the pneumatic timing apparatus is disposed for operation. Suitable conductors 311 connect the motor 132 to the "start" switch 255 and connected in parallel with the motor by conductors 313 is the lamp 26 for the light source 14.

In order to complete the solenoid operating mechanism, the lever 270 is arranged to be biased to a position which will collapse the bellows timer after a timing cycle so that the next cycle of operation will occur without residue air from the previous cycle. A leaf spring 313 connected to the lever 270 as an extension thereof has one end engageable with the lower surface of the extension 206 when the latter has been lowered by the solenoid 240 to thereby force the plate 266 upwardly during venting of the chamber 264. A torsion spring 314 having one end secured to the base 12 and the other end secured to the lever maintains a slight, constant rotational force upon the lever 270 to balance out the weight of the lever 270 and force the same in a clockwise direction as viewed in FIGS.

3 and 4. During expansion of the chamber 264, the extension 206 will be in its uppermost position and out of engagement with the leaf spring 313 and the torsion spring 314 will maintain just enough force upon the lever 270 to prevent the counterclockwise rotation thereof due to its weight. A relief valve 316 in the form of an opening 318 in communication with the cell 258 and a valve element 320 cooperable with the opening is provided on the wall 260 of the pneumatic cell 258 for controlling the flow of air from the cell to the atmosphere and which is operable to the open position after each rotational operation of the dog 200 by the buildup of the quantity of air within the cell. A leaf spring 322 mounted at one end on a stud 324 of the base 12 has its other end in cooperative engagement with an extension 326 of the dog 200 which when rotated to permit rotation of the transfer ring 76 flexes the spring 322 upwardly. The valve element 320 is secured intermediate the ends of the leaf spring and will accordingly be moved upwardly to uncover the opening to atmosphere thereby venting the chamber 264. In operation, after the buildup of the quantity of air in the cell has closed the switch 256 to energize the solenoid 240 and rotate the dog 200 sufficiently to disengage the same from a depression 210, the extension 326 on the dog 200 will flex the spring 322 upwardly and thereby actuate the valve 316 to an open condition. Simultaneously with this movement of the valve element 320, the extension 206 of the dog 200 will flex the leaf spring 313 to cause clockwise rotation of the lever 270 and forceful upward movement of the plate 26. In this event, cell 258 will be vented to the atmosphere and the pneumatic mechanism will be in condition for another timing cycle.

For remote manual operation of the transfer ring 76, a push button switch 328 is connected by conductors 330 to the terminal leads for the switch 256 for bypassing the same and the timer mechanism. The conductors 330 may be of any desired length and an operator need only close the switch 328 to effect energization of the solenoid 240.

Cooling of the light source 14 and the associated lens is accomplished by the fan 300 which when rotating will draw the warm air surrounding the light source therefrom and convey it through the opening 304 on the deck 306 and out the base through the slits 308. A duct 332 is mounted on the base 12 and has one end in communication with the interior of the light source housing 24 and the other end spanning across the openings 82, 84 formed in the plates 64, 68, respectively. As previously stated, the openings 82, 84 are positioned in the preheat station of the slide transfer mechanism, and the duct 332 serves as a means for directing heat from the light source to a slide B while stopped at the preheat station. In this manner, each slide S is exposed to preheating before the same is moved into a projection position thereby inducing buckling or "popping" of the film. This preconditioning of the film slides obviates the need for refocusing the slide when in projection position and results in a continuous accurately-focused projection of all slides which are to be projected.

*Operation*

It is assumed that a plurality of slides S have been placed in face to face relationship in the trough 18 such that the feeding plate 50 is parallel to the planes of each of the slides. The resiliency of the spring 52 will insure that the slides will remain upright and in position to be picked up by the transfer ring 76. Closing of the "start" switch 255 (FIG. 7) will simultaneously energize the lamp 26 and the motor 132 to effect rotation of the fan 300. Assuming that the knob 286 has been turned to a desired time interval for the projection of a slide, the passageway 282 will have been rotated to a position corresponding thereto to permit the build up of air within the chamber 264 of the pneumatic timer cell 258. When the indicated time has elapsed, the quantity of air will be sufficient to rotate the lever 270 in a counterclockwise direction in order to effect closing of the switch 256 and rotation of the dog 200. This latter rotation will disengage the edge 232 of the dog 200 from the end shoulder 212 of the depression 210. Upon this occurrence, the transfer ring 76 will commence to rotate from the position shown in FIG. 5. During the above-described stage of operation, the spring biased feeding plate 50 will have forced a slide S through the opening 80 in the housing 22 and against the baffle plate 98, as shown in FIG. 6. As the transfer ring 76 starts to rotate, the end 214 of the incoming notch 92 will engage the adjacent edge of the incoming slide A and carry the slide therewith. The last portion 104 of the baffle plate 98 will insure that the slide A will be moved centrally in the chamber 74 so that the lower leading corner A' thereof will overlap the adjacent trailing corner B' of the preceding slide B if there be one in the ring. The next succeeding slide will thus overlap the trailing corner $A^2$ of the slide A and so on for all of the slides S to be picked up by the ring. For successful operation of the present invention, it is imperative that the leading corner of each slide overlap the previous slide in this fashion.

As the slide A is rotated around to the preheat station, where slide B is shown in FIG. 5, gravity will cause the slide to move within the notch 92 to the forward end thereof. The time during which the slide will remain here will be determined by the time required for the buildup of the quantity of air in the cell 258 and during this time, warm air from the light source housing 24 will be conveyed by the duct 332 and applied to the slide B for "popping" the same. When the desired time interval has elapsed, the dog 200 will be rotated to release the transfer ring 76 for continued rotative movement. While rotating the slide to the preheat position, the ring 76 will have picked up another slide in the manner aforesaid and with the leading corner of this slide overlapping the trailing corner of the slide in the preheat station. In the next cycle of operation, the slide B will be moved to the projection position, or the position occupied by the slide C. Gravity will cause the slide once again to engage the rear end 214 of the notch and be carried upwardly. While in the projection position, the slide C will be biased against the plate 68 of the housing 22 by a pair of curved leaf springs 340 mounted on the plate 64 and engageable with the sides of the slide (see FIGS. 4, 5 and 6).

Movement of the slide C to the projection position will have moved the leading inner corner C' thereof upon the bent portion 122 of the baffle plate 110, such action being possible because the corner C' had overlapped the trailing corner of the preceding slide and is in position to be guided by the beveled edge 124, see FIG. 5. As the slide C is moved out of the projection position, the same will be deflected by the portions 116 and 114 of the baffle plate 110, out of the ring 76, through the exit opening 90 in the plate 68 and into the receiving trough 20. This operation would be accomplished during the time the ring has rotated through the portion of its cycle wherein another slide is picked up and moved to a preheat position and another slide has moved from this latter position to the projection position. The retaining plate 58 in the receiving trough 20 is moved along the latter against the bias of the spring 60 as the slides S are deposited in the trough 20. When all or some of the slides have been projected, those within the trough 20 may be removed simply by moving the plate 58 farther back and picking the deposited slides out of the trough.

In summary, a full rotation of the transfer ring is accomplished in three successive steps each of which will result in an angular displacement equal to one-third of the full rotation. During each step, a slide will be picked up and another deposited at approximately the same position of the ring and another slide be moved from a preheat station to the projection station. The end 214 of the notch which moves a slide out of the projection position will be the same end which, when the outgoing slide is finally received in the trough 20, will contact the edge of the incoming slide. The rotation of the transfer ring will be stopped at this point since a slide is being projected and the quantity of air within the cell 258 must be raised again. During each successive one-third rotation of the ring, the shutter will have been moved into its light intercepting position and thence to a position to permit projection of a slide. At any time during automatic operation of the projector, that is, when the pneumatic cell 258 is in operation to effect rotation of the ring 76, the manually operable devices, such as the button 250 or the switch 328, may be actuated to effect rotation of the ring. When this happens, the quantity of air being built up in the cell 258 will be vented, and another buildup of the quantity of air will commence starting from the time the manually operable device was started.

From the foregoing description, it will be appreciated that the present invention provides a unified and compact structure occupying a minimum of space and requiring only a minimum of low-cost parts. It will be appreciated that the cycle of operation may be performed semi-automatically and automatically. While there is in the application specifically described one form which the invention may assume in practice, it will be understood that this form is shown for purpose of illustration and that the same may be modified and embodied in various other forms or employed in other uses without departing from its spirit or the scope of the appended claims.

I claim:

1. In a slide projector having a light source and an aligned optical system defining a projection position, the combination comprising a base, a first trough mounted on said base for holding a plurality of slides in parallel side by side positions prior to movement of said slides into projection position, a second trough mounted on said base for receiving the slides after projection thereof and having its longitudinal axis substantially in alignment with the longitudinal axis of said first trough, a rotatable slide carrier mounted between said troughs, means for mounting said carrier for rotation on an axis parallel to said longitudinal axis, means for controlling rotation of said carrier from a position between the opposed ends of said troughs to said projection position and back to said opposed ends, and deflecting means cooperable with said slide carrier during rotation thereof for deflecting a slide from said first trough into one side of said carrier, said carrier thereupon moving the slide into projection position for projection thereof, and a second deflecting means thereafter cooperable with said carrier for moving the slide out the opposite side of said carrier into said second trough after projection thereof.

2. In a slide projector having a light source and an aligned optical system defining a projection position, the combination comprising a base, a first trough mounted on said base for holding a plurality of slides in parallel side by side positions prior to movement of said slides into projection position, a second trough mounted on said base for receiving the slides after projection thereof and having its longitudinal axis substantially in alignment with the longitudinal axis of said first trough, a rotatable slide carrier, a housing mounted on said base for supporting and enclosing said carrier, said housing including a first side wall on one side thereof and having an opening for receiving slides from said first trough and a second side wall on the opposite side thereof and having an opening for permitting the egress of projected slides into said second trough, and deflecting means cooperable with said slide carrier during rotation thereof for picking up a slide from said first trough and deflecting it into one side of said carrier, said carrier thereupon moving the slide into projection position for projection thereof a second deflecting means thereafter cooperable with said carrier for moving the slide out the opposite side of said carrier into said second trough after projection thereof.

3. In a slide projector having a light source and an aligned optical system defining a projection position, the combination comprising a base, a first trough mounted on said base for holding a plurality of slides in parallel side by side positions prior to movement of said slides into projection position, a second trough mounted on said base for receiving the slides after projection thereof and having its longitudinal axis substantially in alignment with the longitudinal axis of said first trough, a rotatable slide carrier, a housing mounted on said base for supporting and enclosing said carrier, said housing including a first side wall on one side thereof and having an opening for receiving slides from said first trough and a second side wall on the other side thereof and having an opening for permitting the egress of projected slides into said second trough, each of said side walls having another opening aligned with the optical axis of the optical system, and deflecting means cooperable with said slide carrier during rotation thereof for picking up a slide from said first trough and deflecting it into one side of said carrier, said carrier thereupon moving the slide into a position between said aligned openings in said side walls for projection thereof, and a second deflecting means thereafter cooperable with said carrier for moving the slide out the opposite side of said carrier into said second trough after projection thereof.

4. In a slide projector having a light source and an aligned optical system defining a projection position, the combination comprising a base, a first trough mounted on said base for holding a plurality of slides in parallel side by side positions, a second trough mounted in alignment with said first trough on said base for receiving the slides after projection thereof, a rotatable slide carrier, a housing for supporting said carrier and having means for mounting said carrier for rotation, means for controlling rotation of said carrier from a position between the opposed ends of said troughs to said projection position and back to said opposed ends, and deflector plates mounted within said housing and cooperable with said carrier during rotation thereof for directing a slide into one side of said carrier from said first trough for movement of the slide with the carrier and simultaneously ejecting a projected slide from the opposite side of said carrier and out of said housing into said second trough.

5. In a slide projector having a light source and an aligned optical system defining a projection position, the combination comprising a base, a first trough mounted on said base for holding a plurality of slides in parallel side by side positions, a second trough mounted on said base for receiving the slides after projection thereof and having its longitudinal axis substantially in alignment with the longitudinal axis of said first trough, a rotatable slide carrier, a housing for supporting said carrier and having means for mounting said carrier for rotation, said carrier having means thereon for picking up an adjacent slide and moving the same therewith, a first deflector plate mounted within said housing for directing the introduction of a slide into one side of said carrier from said first trough after the slide has been picked up, and a second deflector plate mounted within the housing for directing the exit of a slide from the opposite side of said carrier into said second trough, means for rotating said carrier for moving the slide to said projection position and back to said second trough.

6. In a slide projector having a light source and an aligned optical system defining a projection position, the combination comprising a base, a slide holding means mounted on said base for holding a plurality of slides in parallel side by side relationship, a slide carrier mounted on said base and cyclically movable thereon from a position adjacent said holding means to said projection position and back to said holding means, motor and drive means connected to said carrier, a clutch mechanism operatively associated between said carrier and said drive means for controlling movement of said carrier between said positions during operation of said drive means, a detent mechanism engageable with said carrier and being normally effective to arrest movement of said carrier, and a pneumatic timer mechanism having means engageable with said detent mechanism after predetermined time intervals for rendering said detent mechanism ineffective to permit movement of said carrier as aforesaid.

7. In a slide projector having a light source and an aligned optical system defining a projection position, the combination comprising a base, a slide holding means mounted on said base for holding a plurality of slides in parallel side by side relationship, a rotary slide carrier, means for mounting said carrier for rotation on said base, said carrier being adapted for movement between a position for picking up a slide and said projection position, motor and drive means connected to said carrier for rotating the same, means associated with said carrier for picking up a slide from said holding means and depositing a slide thereat after projection thereof, a clutch mechanism operatively associated between said carrier and said drive means for controlling movement of said carrier between said positions during operation of said drive means, a detent mechanism engageable with said carrier and being normally effective to arrest movement of said carrier, and a pneumatic timer mechanism having means engageable with said detent mechanism after predetermined time intervals for rendering said detent mechanism ineffective to permit movement of said carrier as aforesaid.

8. In a slide projector having a light source and an aligned optical system defining a projection position, the combination comprising a base, a slide holding means mounting on said base for holding a plurality of slides in parallel side by side relationship, a slide carrier mounted on said base and cyclically movable thereon from a position adjacent said holding means to said projection position and back to said holding means, motor and drive means connected to said carrier, a clutch mechanism operatively interconnecting said carrier and said drive means for controlling movement of said carrier between said positions during operation of said drive means, a rotatable element pivoted on said base, means formed on said carrier and normally engageable with said element for arresting movement of said carrier, a shutter pivotally mounted on the base for controlling the transmission of light at said projection position, a member connected between said rotatable element and said shutter for pivoting the latter out of light intercepting position when said element has been rotated out of engagement with said carrier, and control means operable upon said rotatable element for disengaging the same from said carrier to permit movement thereof.

9. In a slide projector having a light source and an aligned optical system defining a projection position, the combination comprising a base, a slide holding means mounted on said base for holding a plurality of slides in parallel side by side relationship, a slide carrier mounted on said base and cyclically movable thereon from a position adjacent said holding means to said projection position and back to said holding means, motor and drive means connected to said carrier for moving the same between said positions, a detent mechanism engageable with said carrier and being normally effective to arrest movement of said carrier, control means operable upon said detent mechanism for rendering the latter ineffective to permit movement of said carrier, and a pneumatic cell for actuating said control means when the quantity of air within said cell has reached a predetermined amount.

10. In a slide projector having a light source and an aligned optical system defining a projection position, the combination comprising a base, a fan mounted in said base for cooling the light source, a slide holding means mounted on said base for holding a plurality of slides in parallel side by side relationship, a slide carrier mounted on said base and cyclically movable thereon from a position adjacent said holding means to said projection position and back to said holding means, motor and drive means connected to said carrier for moving the same between said positions, a locking mechanism engageable with said carrier and being normally effective to arrest movement of said carrier, control means operable upon said locking mechanism for rendering the latter ineffective to permit movement of said carrier, a pneumatic cell for actuating said control means when the quantity of air within said cell has reached a predetermined amount, and air carrying means connected between the pressure side of said fan and said cell for continually directing the flow of air into said cell.

11. In a slide projector having a light source and an aligned optical system defining a projection position, the combination comprising a base, a fan mounted in said base for cooling the light source, a slide holding means mounted on said base for holding a plurality of slides in parallel side by side relationship, a slide carrier mounted on said base and cyclically movable thereon from a position adjacent said holding means to said projection position and back to said holding means, motor and drive means connected to said carrier for moving the same between said positions, a detent mechanism engageable with said carrier and being normally effective to arrest movement of said carrier, control means operable upon said detent mechanism for rendering the latter ineffective to permit movement of said carrier, a pneumatic cell for actuating said control means when the quantity of air within said cell has reached a predetermined amount, air conveying means connected between the pressure side of said fan and said cell for continually directing the flow of air into said cell, and a manually operable valve interposed in said conveying means for controlling the amount of air flowing to the latter.

12. In a slide projector having a light source and an aligned optical system defining a projection position, the combination comprising a base, a slide holding means mounted on said base for holding a plurality of slides in parallel side by side positions, a rotatable slide transferring member mounted for rotation on said base and having its axis of rotation parallel to the optical axis of the system, motor means for rotating said member, means for controlling rotation of said member to position the same in at least three full stop positions during a complete revolution thereof, deflecting means cooperable with said rotatable member for picking up a slide from said slide holding means when said member is moving to one of said full stop positions, a preheating means mounted on said base, said preheating means arranged to preheat a slide when said member is in a second of said full stop positions, said controlling means being adapted to rotate said member to a third full stop position for permitting projection thereof and move the slide back to said holding means after projection thereof during continued rotation of said member.

References Cited in the file of this patent
UNITED STATES PATENTS

| | | |
|---|---|---|
| 1,437,112 | Lepine | Nov. 28, 1922 |
| 1,645,204 | Nothstine | Oct. 11, 1927 |
| 2,038,784 | Ghadiali | Apr. 28, 1936 |
| 2,583,442 | Parlini | Jan. 22, 1952 |
| 2,613,574 | Moss | Oct. 14, 1952 |
| 2,705,438 | Peto | Apr. 5, 1955 |
| 2,773,323 | Gorwitz | Dec. 11, 1956 |

UNITED STATES PATENT OFFICE
CERTIFICATE OF CORRECTION

December 5, 1961

Patent No. 3,011,398

James A. Clark

It is hereby certified that error appears in the above numbered patent requiring correction and that the said Letters Patent should read as corrected below.

Column 4, line 54, for "which fits within the counterbore and an" read -- spring 164 encircles the shaft 140 and the --; column 6, line 43, for "shuttere" read -- shutter --; column 7, line 33, for "ligh" read -- light --; line 57, for "plungere" read -- plunger --; column 9, line 30, for "26" read -- 266 --.

Signed and sealed this 17th day of April 1962.

(SEAL)
Attest:

ESTON G. JOHNSON
Attesting Officer

DAVID L. LADD
Commissioner of Patents